United States Patent [19]

Carroll et al.

[11] 4,402,125

[45] Sep. 6, 1983

[54] MACHINING CENTER

[75] Inventors: Richard R. Carroll, Chagrin Falls; Alan M. Papp, Eastlake, both of Ohio

[73] Assignee: Litton Industrial Products, Inc., Cleveland, Ohio

[21] Appl. No.: 290,412

[22] Filed: Aug. 5, 1981

[51] Int. Cl.³ .............................................. B23Q 1/57
[52] U.S. Cl. ...................................... 29/568; 211/1.5
[58] Field of Search ..................... 29/568, 26 R, 26 A; 211/1.5; 414/744 R, 749

[56] References Cited

U.S. PATENT DOCUMENTS

| | | | |
|---|---|---|---|
| 3,300,856 | 1/1967 | Daugherty | 29/568 |
| 3,762,568 | 10/1973 | Dimitrov et al. | 211/1.5 |
| 4,087,901 | 5/1978 | Lohneis et al. | 29/568 |
| 4,119,213 | 10/1978 | Sato et al. | 29/568 X |

FOREIGN PATENT DOCUMENTS

| | | | |
|---|---|---|---|
| 37292 | 10/1981 | European Pat. Off. | 29/568 |
| 2737225 | 2/1979 | Fed. Rep. of Germany | 29/568 |
| 2391028 | 1/1979 | France | 29/568 |

Primary Examiner—William R. Briggs
Attorney, Agent, or Firm—Spencer T. Smith

[57] ABSTRACT

A machining center comprising tool spindle means, tool changing means, tool drum assembly means including first and second axially spaced integral tool drums each having a plurality of tool holding chucks about the periphery thereof, each of the tool holding chucks having a movable jaw, extension means operatively associated with each the movable jaw on one of the first and second tool drums for permitting movement of the associated movable jaw from a predetermined remote location, tool housing means for rotatably supporting the tool drum assembly means including first actuator means for displacing the one of the extension means of the one tool drum located at a selected location, and second actuator means for displacing one of the movable jaws of the other one of the tool drums located at a selected location, means for supporting the tool housing means for axial displacement, and means for axially displacing the tool housing means from a first position to a second position.

5 Claims, 2 Drawing Figures

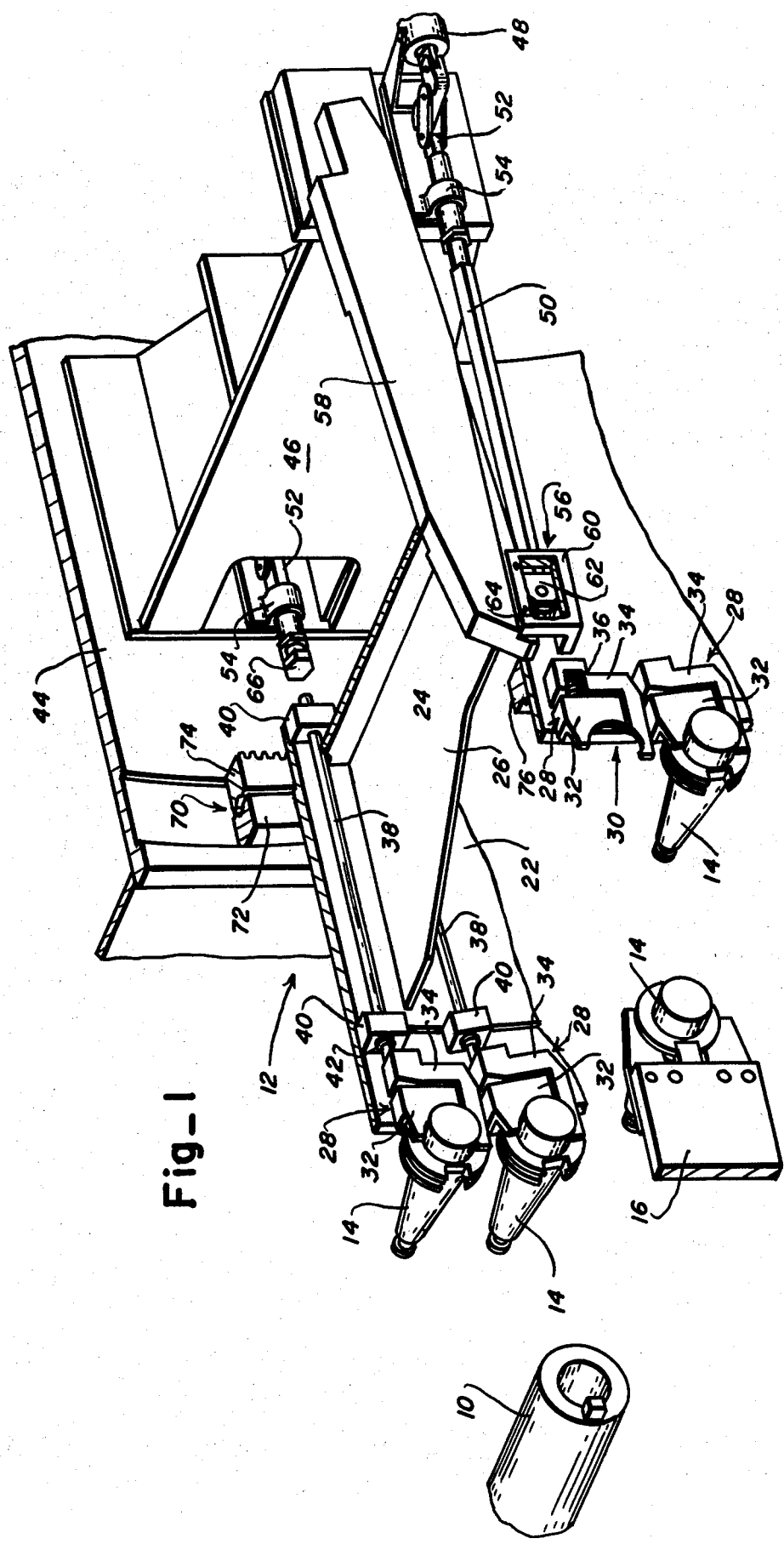
Fig_1

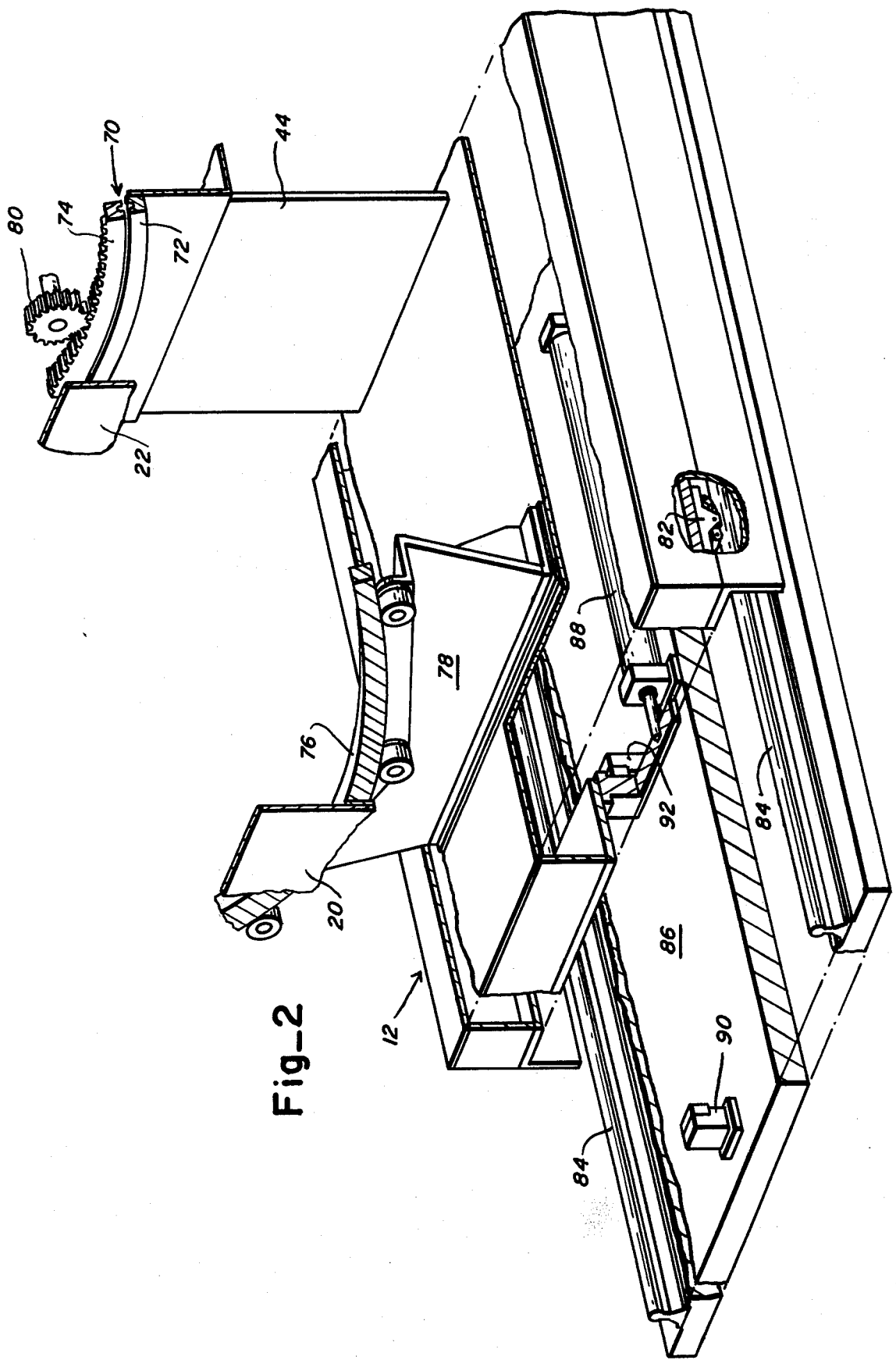

MACHINING CENTER

This invention relates to machining centers which have a rotatable tool spindle and a tool changing and storing mechanism for storing a plurality of individually utilized tools and for sequentially transferring tools to and from the machine tool spindle.

The number of tools stored by a tool magazine is a key design limitation. It is, accordingly, an object of the present invention to provide a tool magazine assembly for a machining center which can store a large number of tools.

Other objects and advantages of the present invention will become apparent from the following portion of the specification and from the accompanying drawings which illustrate, in accordance with the mandate of the patent statutes, a presently preferred embodiment incorporating the teachings of the invention.

FIG. 1 is a perspective partial view of a machining center made in accordance with the teachings of the present invention; and FIG. 2 is a partial perspective view of a tool magazine assembly of the machining center illustrated in FIG. 1.

The disclosed machining center generally includes a rotatable tool spindle 10, a tool magazine assembly 12 for storing a plurality of discrete tools 14 and a tool changing mechanism including a tool change arm 16 for transferring tools between the tool spindle and the tool magazine.

The tool magazine assembly 12 includes a tool drum assembly 18 having integral axially spaced front and rear tool carousels or drums 20, 22 joined by a cylindrical member 24 and a plurality of structural plates 26. Tool holding assemblies including tool pots or chucks 28 are mounted around the periphery of each drum. The tool held by the tool change arm 16, which was removed from the tool spindle 10 by relative axial movement therebetween, may be placed in storage by displacing the tool change arm 16 to radially advance the gripped tool 14 into the empty tool pot 28 which is located at a predetermined ready position 30. Once the tool change arm is retracted, the next tool can be located at the ready position by axially indexing the drums, if necessary, and rotating the drum assembly to present the next tool at the ready position.

Each tool pot 28 includes a fixed upper jaw 32 and a pivotal lower jaw 34 which is biased by a heavy-duty spring 36 to a tool gripping position. While each tool holding assembly on the front tool holding drum 20 includes only the tool holding pot 28, each tool holding assembly on the rear tool holding drum 22 further includes a pivotal jaw extender in the form of a rod 38 which effectively extends the pivotal jaw 34 to the interior of the tool drum 22. Each push rod 38 is secured to the drum 22 by a pair of mounting blocks 40. A retaining ring 42 secured to each push rod 38 limits its rearward displacement.

A magazine housing 44 rotatably supports the tool drum assembly 18 and includes a central portion 46 extending through the interior of the drum assembly for supporting front and rear tool pot actuators. The front tool pot actuator includes a hydraulic cylinder 48 which displaces an elongated adjustable actuator rod 50 through a linkage 52.

Displacement of the elongated rod 50 is controlled at one end by a cylindrical guide 54 and at the other front end by a guide way 56 defined by a housing strut 58 which extends outwardly from the central portion 46, an L-shaped member 60 secured thereto, and the front face of the rotatable front drum 20. A vertical guide strip 62 is secured to the front end of the elongated rod and rotatably supports a roller 64. Advancement of the elongated rod 50 from the illustrated remote position to an advanced position will forcefully engage the roller 64 with the lower pivotal jaw 34 of the tool pot 28 located at the ready position 30 to open the tool pot.

The rear actuator also includes a hydraulic cylinder (not shown) which displaces an adjustable actuator rod 66 through a linkage arrangement 52. The actuator rod is selectively displaceable from the illustrated retracted position to an advanced position for opening a rear drum tool pot. Displacement of the rear actuator rod 66 is guided by a rear cylindrical guide 54 secured to the housing.

The tool drum assembly 18 is mounted on the magazine housing 44 for selected rotation about its axis. A ring bearing 70 including an outer race 72 is secured to the housing 44 and supports an inner ring gear 74 secured to the rear drum 22. The front drum 20 includes a rearwardly projecting annular member 76 which is supported by a three-roller housing cradle 78. A motor including a drive gear 80 is mounted on the housing 44 in operative relation with the ring gear 74 for rotating the drum assembly 18.

The magazine housing includes a pair of axially spaced single roundway bearings 82 (one shown) on one side of the housing and a pair of axially spaced double roundway bearings (not shown) on the other side of the housing for engagement with a pair of rails 84 on a housing assembly support member 86.

A pneumatic cylinder 88 which extends between the support member 86 and the magazine assembly 12 selectively axially displaces the magazine assembly 12 between advanced and retracted positions defined by stop members 90, 92.

What is claimed is:
1. A machining center comprising
   tool spindle means,
   tool changing means,
   tool drum assembly means including
      first and second integral tool drums rotatable about and axially spaced along a selected axis each having a plurality of tool holding chucks about the periphery thereof,
      each of said tool holding chucks having a movable jaw,
      an extension rod operatively associated with each said movable jaw on one of said first and second tool drums for permitting movement of said associated movable jaw from a predetermined remote location,
   tool housing means for rotatably supporting said tool drum assembly means including
      first actuator means for displacing the extension rod of said one tool drum located at a selected angular location for displacing the movable jaw of the associated tool holder located at the selected angular location, and
      second actuator means for displacing the movable jaw of the tool holding chuck of the other one of said tool drums located at the same selected angular location,
   means for supporting said tool housing means for axial displacement, and means for axially displacing said tool housing means from a first position to a second position.

2. A machining center according to claim 1 wherein said tool housing means includes a central portion extending centrally within said tool drums.

3. A machining center according to claim 2 wherein said second actuator means includes a strut extending outwardly from said central housing portion to a location proximate a movable jaw located at said selected position.

4. A machining center according to claim 3 wherein said second actuating means further includes an L-shaped guide means secured to the free end of said strut, defining with the tool drum, guide means.

5. A machining center according to claim 4 wherein said second actuating means further includes rod means including an end portion selectively contained by said guide means.

* * * * *